United States Patent [19]

Finegold

[11] 4,087,054

[45] May 2, 1978

[54] ARMATURE TRANSFER MECHANISM FOR ARMATURE WINDERS

[75] Inventor: Hyman B. Finegold, Dayton, Ohio

[73] Assignee: The Globe Tool and Engineering Company, Dayton, Ohio

[21] Appl. No.: 766,690

[22] Filed: Feb. 8, 1977

[51] Int. Cl.[2] .............................................. B65G 29/00
[52] U.S. Cl. ................................. 242/7.05 B; 214/1 BC
[58] Field of Search .................... 242/7.05 B, 7.05 R, 242/7.05 A, 7.05 C, 7.03, 7.04, 18 A, 25 A, 18 R, 25 R, 79; 214/1 B, 1 BB, 1 BC, 1 BD

[56] References Cited

U.S. PATENT DOCUMENTS

| 2,947,427 | 8/1960 | Moore .................................... 214/1 B |
| 3,524,601 | 8/1970 | Biddison et al. ..................... 242/7.03 |
| 3,776,397 | 12/1973 | Hoy et al. ............................ 214/8.5 K |
| 3,938,748 | 2/1976 | Camardella .......................... 242/7.09 |
| 3,964,847 | 6/1976 | Redmer et al. ....................... 425/125 |
| 3,968,885 | 7/1976 | Hassan et al. ...................... 214/1 BC |
| 4,006,862 | 2/1977 | Shively et al. .................... 242/7.05 B |

FOREIGN PATENT DOCUMENTS

| 2,403,421 | 7/1975 | Germany ......................... 242/7.05 R |

*Primary Examiner*—Stanley N. Gilreath
*Attorney, Agent, or Firm*—Dybvig & Dybvig

[57] ABSTRACT

A transfer mechanism for transferring armature forms between a supply pallet and an armature winding machine comprises a turret plate rotatable through 180° angles for presenting opposite margins thereof successively to said supply pallet and said winding machine. In operation, the supply pallet is indexed to receive wound armature forms held by a first armature gripping mechanism mounted on said turret plate and to supply unwound armature forms to said first gripping mechanism. As these events occur, the turret plate supports a second armature gripping mechanism which presents unwound armature forms to the winding machine. The winding machine has winding guide members cooperating with semicircular spaces located in a post projecting upwardly from a mounting plate supporting the turret plate to support the unwound armature forms in position for the winding of coils thereon. The armature gripping mechanisms include means to rotate the armature forms and also includes means to appropriately position the wire being wound for tang connections. After such coil winding, the turret plate is rotated 180° so that the wound armatures gripped by the second gripping mechanism can be returned to the supply pallet and unwound armatures can be simultaneously transferred by the first gripping mechanism for presentation to the winding machine.

7 Claims, 5 Drawing Figures

ARMATURE TRANSFER MECHANISM FOR ARMATURE WINDERS

BACKGROUND OF THE INVENTION

1. Field of the Invention

The present invention relates to automatic armature winding equipment and more particularly to a transfer mechanism associated with the winding equipment for gripping unwound armature forms presented by a supply pallet for later transfer to a winding machine which simultaneously winds armatures, and for then returning the wound armatures to the supply pallet at the same time the unwound forms which were gripped during the aforesaid winding are advanced to the winding machine.

3. Prior Art

Various mechanisms have been developed over the years for transferring armature forms and the like from supply stations to winding stations. A difficulty heretofore encountered resides in undesirable winding machine delays occasioned by the machine first awaiting removal of wound armatures and then continuing to await the receipt of new armature forms to be wound.

SUMMARY OF THE INVENTION

In the present invention, winding machine delays have been minimized by utilizing the same time interval for the withdrawal of wound armatures from the machine and the delivery of new armature forms to the machine. This doubling of function within a single time period necessitates that new armature forms be readied for delivery to the machine simultaneously as preceding armature forms are wound, thus to enable the delivery of new forms to the machine simultaneously as the preceding wound armatures are withdrawn from the machine. In the present invention, this is accomplished by utilizing a rotatable turret plate having duplicate armature gripping collet mechanisms at opposite ends of the turret plate such that during the time period armature forms supplied by a collet mechanism at one end of the turret plate are being wound, new armature forms can be supplied to the duplicate collet mechanism at the opposite end of the turret plate, the consequence being that a simple, quickly performed 180° rotation of the turret plate effects during the same time period a transfer of wound armatures from the winding machine for further processing and a transfer of unwound armature forms to the winding machine.

BRIEF DESCRIPTION OF THE DRAWINGS

In the drawings:

FIG. 3 is a section view taken substantially along the line 3—3 of FIG. 2 with portions broken away.

DESCRIPTION OF THE PREFERRED EMBODIMENT

Figure 1:
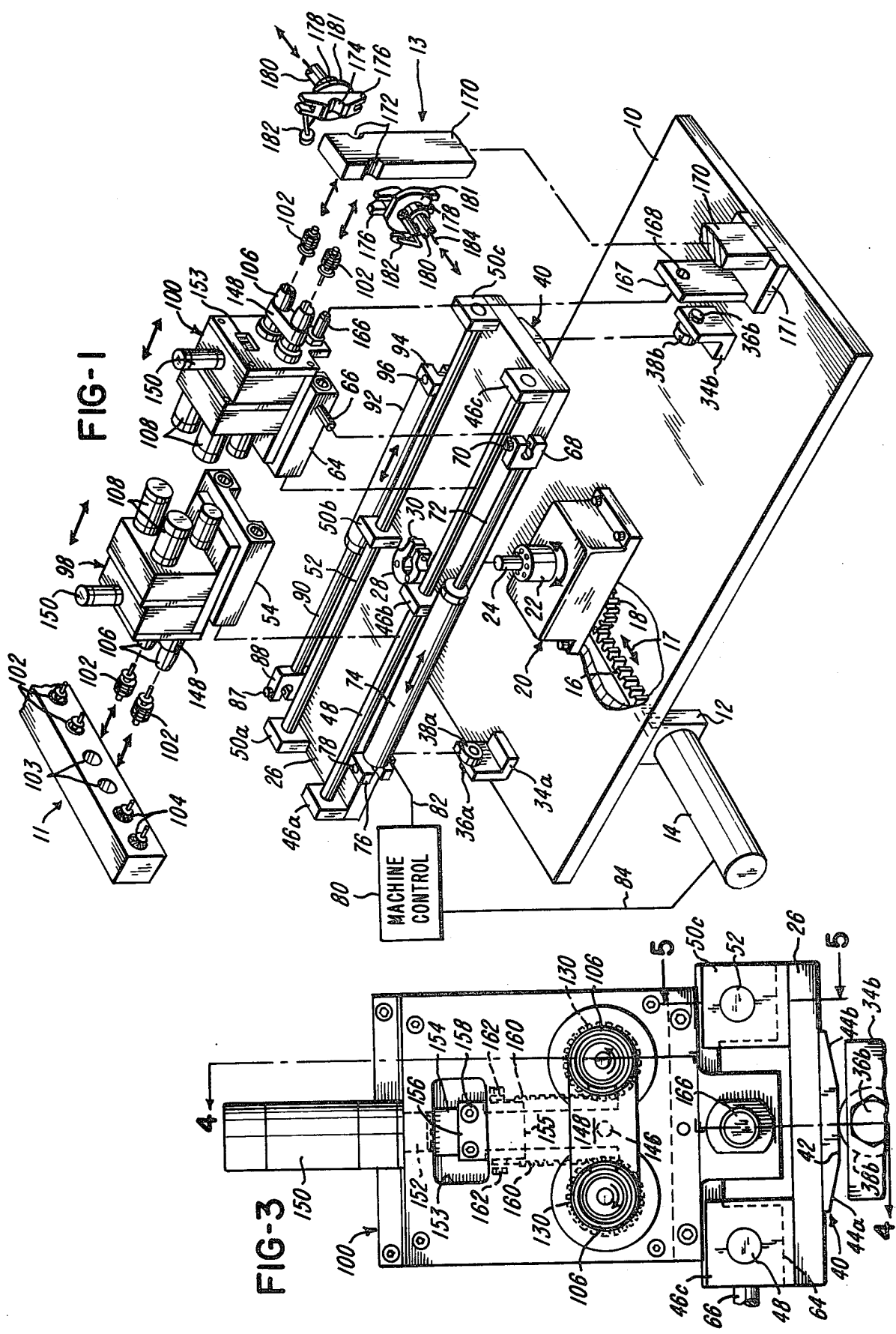
FIG. 1 is an exploded perspective view of an armature transfer mechanism in accordance with the present invention.

The armature transfer mechanism of the present invention is assembled upon a stationary support plate 10 disposed in a space located between a pallet supply mechansim 11 on the one side and a winding mechanism 13 on an opposite side of the space.

Welded to the underside of the plate 10 is a mounting plate 12 for supporting an actuator 14. The actuator 14, which may comprise a hydraulic or pneumatic cylinder, positions a rack 16, supported by means not illustrated, for to and fro movements in the directions illustrated by the arrow 17.

The rack 16 has toothed engagement with a pinion 18, the motion of which is transferred to a cam box 20, which is of a conventional, commercially available construction. The cam box 20 outputs a rotary motion proportional to the linear motion of the rack 16 to an output shaft 24. The actuator 14, rack 16, pinion 18 and cam box 20 are sized to produce exact 180° in turns, to and fro, of the output shaft 24. The shaft 24 rotates within a suitable bearing 22 projecting upwardly from the cam box 20.

Figure 2:
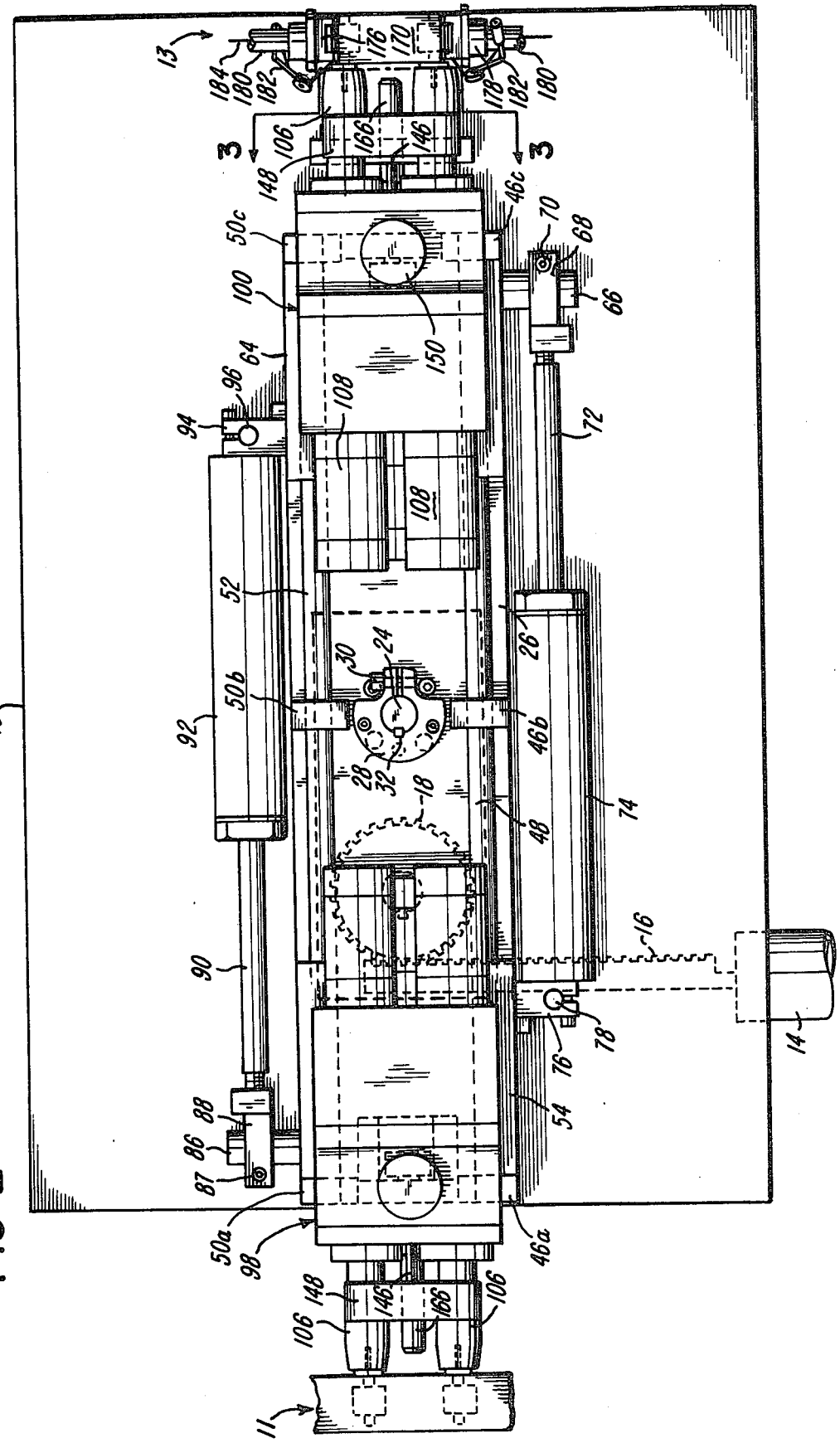
FIG. 2 is a top plan view of the armature transfer mechanism with portions broken away.

The output shaft 24 projects upwardly through a suitable aperture (not shown) located in a turret plate 26 to be seized by a clamp 28 affixed as by riveting to the turret plate 26 and tightened by means of a clamp screw 30. The clamp 28 is keyed to the output shaft 24 by means of a key 32 appearing in FIG. 2.

The support plate 10 can be seen in FIG. 1 to be an elongated plate having a support bracket 34a mounted centrally at one end thereof and a support bracket 34b mounted centrally but spaced inwardly from the opposite end thereof. The bracket 34a journals a shaft 36a having a hexagonal head and encircled by a roller bearing 38a. Likewise, the bracket 34b journals a similar shaft 36b supporting a roller bearing 38b, the brackets 34a and 36b being disposed in spaced apart confronting relation to two diametrically opposite sides of the output shaft 24.

The turret plate 26 has a cam 40 projecting downwardly from each end thereof. Only the right-hand cam 40 appears in the drawings. Each cam 40 includes a central flat 42 facing downwardly toward the support plate 10, with the flat 42 being flanked by inclined shoulders 44a and 44b. Upon rotation of the turret plate 26, when driven by the output shaft 24 to the position illustrated in FIG. 1, the cams 40 engage the respective bearing rollers 38a and 38b, which, functioning as cam followers, roll under the inclined cam shoulders to lift the turret plate 26 and relieve any tendency of the turret plate 26 to bend downwardly toward the support plate 10.

Mounted along one side of the turret plate 26 are a plurality of apertured blocks 46a, 46b and 46c which cooperate to support a cylindrical rod or slide 48. Similar blocks 50a, 50b and 50c mounted along the opposite side of the turret plate 26 cooperate to support a second rod or slide 52 in parallel relation to the aforementioned rod 48.

The rods 48 and 52 cooperate to support a slider 64 which has lengthwise sliding motion along the turret plate 26 between the blocks 46c and 50c at one end thereof and the blocks 46b and 50b at the central portion of the turret plate.

Figure 5:
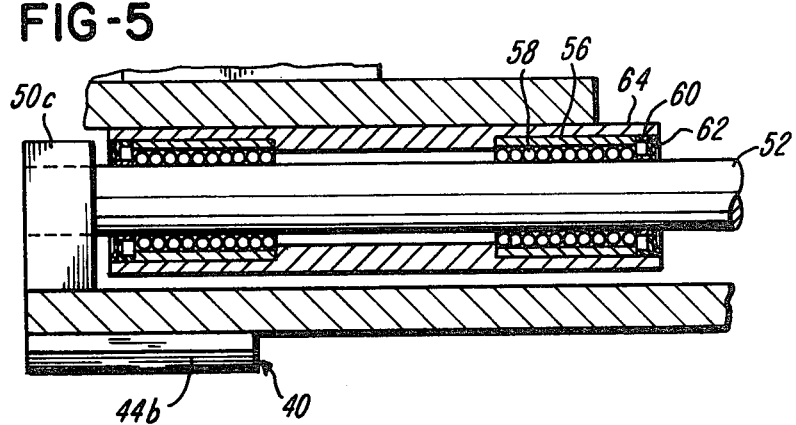
FIG. 5 is a fragmentary section view taken substantially along the line 5—5 of FIG. 3.

As best seen in FIG. 5, the slider 64 is equipped with bearing sleeves 56 which support ball bearings 58 for rolling engagement with the rod 52. The ball bearings 58 are caged by means of a caging ring 60 secured to the body of the slider 64 by a lock ring 62. It will be appreciated that the slider 64 has four ball bearing assemblies such as above described, there being two ball bearing assemblies engaged to the rod 52 and an additional two bearing assemblies engaged to the rod 48.

A similarly constructed slider 54 is engaged by suitable ball bearing means such as described above to roll laterally upon the rods 48 and 52 between the blocks 46a and 50a at the opposite end of the turret plate 26 and the centrally disposed blocks 46b and 50b.

Projecting outwardly from the slider 64 is a drive pin 66 secured in a clevis 68 with aid of a lock pin 70. The clevis 68 is driven laterally by a piston rod 72 powered by a hydraulic or pneumatic cylinder 74. The cylinder 74 is anchored to a bracket member 76 by a locking pin 78. The bracket member 76 is affixed to the turret plate 26.

The slider 54 is equipped in a similar fashion with an outwardly projecting pin 86 secured by a pin 87 to a clevis 88 mounted to a piston rod 90 driven by the hydraulic or pneumatic cylinder 92 attached to the turret plate 26 by means of a pin 96 engaging a bracket 94.

The cylinders 74 and 92 respectively controlling the sliders 64 and 54 are energized subject to the supervision of machine control circuitry schematically illustrated in the block 80 (FIG. 1). The connector 82 emanating from the machine control 80 schematically depicts the supply of power to the cylinder 74. A similar connector (not shown) also emanating from the machine control 80 supplies power to the cylinder 92. Another schematically illustrated connector 84 depicts the supply of power to the actuator 14, whose operation will position the turret plate 26.

Mounted fixedly upon the sliders 54 and 64 are armature gripping collect mechanisms 98 and 100. As will be more fully explained, the gripping mechanisms 98 and 100 are of substantially identical construction, and, as will become apparent in the following description, each gripping mechanism is adapted to handle simultaneously a pair of unwound armatures 102 picked up at the pallet mechanism 11. The handling of the armatures 102 in pairs is a convenience resulting from the size of the armatures and the character of the winding mechanism to which the present invention has been adapted. It is to be appreciated, however, that the gripping mechanisms 98 and 100 may, dependent upon the requirements of the winding equipment, be adapted to handle only single armatures or greater numbers of armatures.

Assuming the handling of armatures in pairs as disclosed, the operating sequence will proceed generally as follows. The pallet mechanism 11, which may be of any desired length and which may have other shapes such as a circular shape, is provided with a number of spaced apart bores 103 sized to receive unwound armature forms 102 and also to receive wound armatures 104. Unwound armature forms may be delivered to the pallet mechanism 11 by any machinery (not shown) which is suitable for this purpose. At appropriate intervals, the gripping mechanisms 98 and 100 grip the armatures in pairs for transfer to the winding machinery. Thus, FIG. 1 schematically illustrates two unwound armatures 102 about to be gripped for transfer by the gripping mechanism 98. To accomplish such gripping, the gripping mechanism 98, which ordinarily occupies a central position on the rods 48 and 52 near the blocks 46b and 50b, is indexed outwardly to the left as appears in FIG. 1 by an energizing signal received from the machine control 80 by the cylinder 92. This indexes the slider 54 outwardly to the left as it appears in FIG. 1, where collect members presently concealed by tang shields 106 are actuated by mechanism to be described to grip the unwound armatures 102. The slider 54 is then returned toward the central portion of the turret plate 26 adjacent the blocks 46b and 50b. As the foregoing steps involving the gripping of unwound armatures supplied by the pallet mechanism 11 are completed, other unwound armatures previously delivered to the winding mechanism 13 by means of the slider 64 are wound by the winding machine.

Assuming such winding to be complete, the sliders 64 and 54 are indexed inwardly toward the center of the turret plate 26 by an operation of the cylinders 74 and 92. The actuator 14 is then energized by an appropriate signal received from the machine control 80 to rotate the turret plate 26 180°, thus placing the gripping mechanism 100 and the newly wound armatures carried thereby to the left side of FIG. 1 and placing the newly gripped but unwound armatures 102 associated with the slider 54 to the right of FIG. 1.

It should be noted that numerous electrical conductors together with numerous hydraulic and/or pneumatic cables for supplying power to the gripping mechanisms 98 and 100 have been omitted from the drawings so as not to obscure structural details sought to be illustrated. However, the presence of such connections render it expedient to limit the rotational movement of the turret plate 26 to 180° to and fro, thus to prevent the cable connections and the like from winding one about the other.

Having transferred wound armatures to the left and unwound armatures to the right, the machine control 80 energizes the cylinder 92 to return wound armature 104 to the pallet mechanism 11 and energizes the cylinder 74 to deliver unwound armature forms 102 to the winding mechanism. As such unwound armatures are being wound, the pallet mechanism 11 is indexed to carry the wound armatures 104 to the left and front as viewed in FIG. 1 and to position unwound armature forms for gripping as a pair by the gripping mechanism 100. It will be noted that there may be two armatures being wound for which no bores 103 are required in the pallet mechanism 11.

Figure 4:
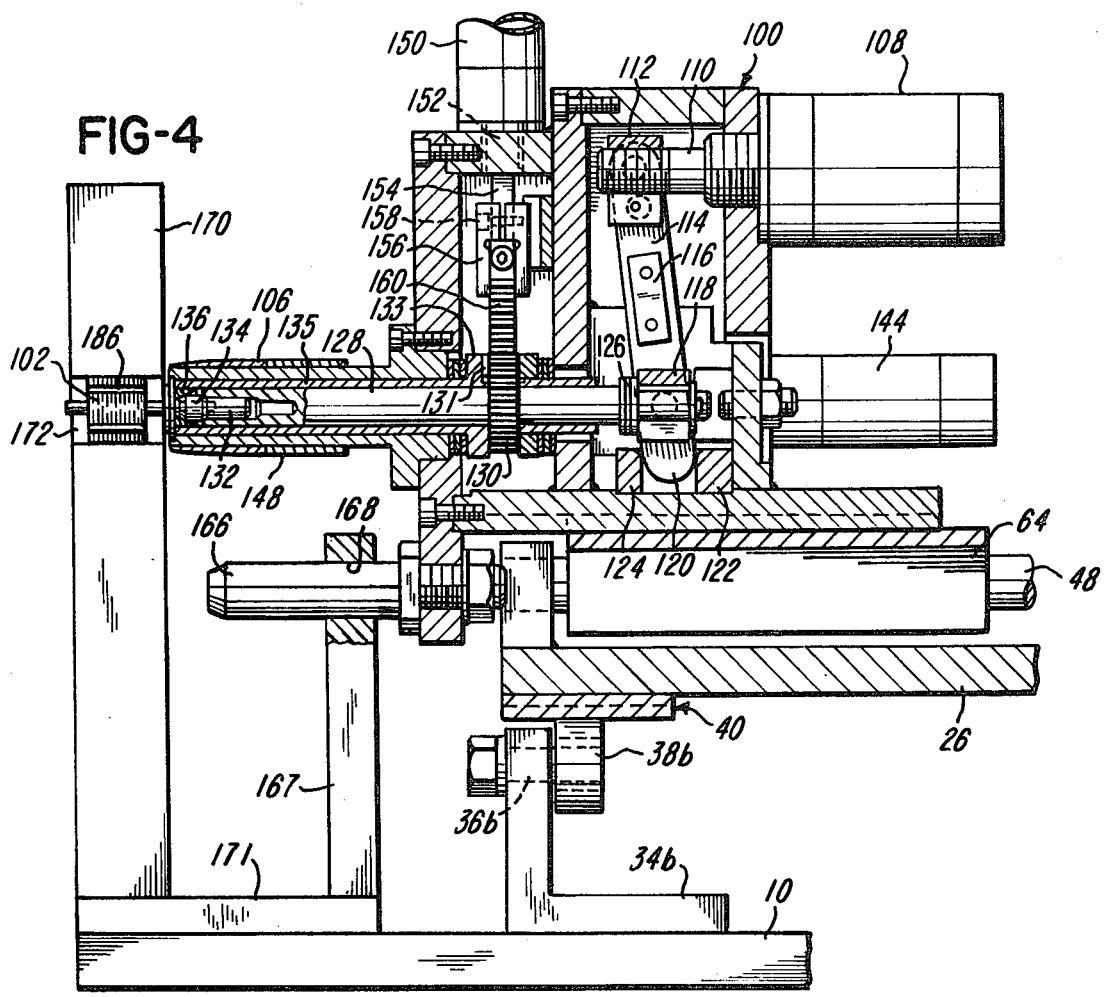
FIG. 4 is a fragmentary section view taken substantially along the line 4—4 of FIG. 3.

The construction of the gripping mechanism 100 is illustrated in detail sufficient to enable an understanding of its operation in FIGS. 3 and 4. Referring initially to FIG. 4, which shows only half of a two-collet gripping mechanism, the gripping mechanism includes an actuator 108 such as an air cylinder which actuates a piston rod 110 threadedly engaged into a collar 112. Pivotally attached to the collar 112 is a depending link 114. The link 114 comprises two generally duplicate pieces joined in facially confronting relation on opposite sides of a spacer 116. The lower ends of the confronting links 114 are spaced apart by means of a collar member 118. The lowermost ends of the facially confronting links 114 are rounded as shown at 120 and interposed between bearing blocks 122 and 124 so as to allow pivotal movements of the links 114 in response to actuations by the actuator 108.

The collar member 118 is joined to an actuator shaft 128 through the medium of a thrust bearing 126. The shaft 128 is encircled by a gear 130 which rotates freely and can slide axially with respect to the shaft 128. The gear 130 can also be seen to be keyed by a key 131 to a flange 133 integrally formed on an elongate sleeve 135 surrounding the shaft 128. The left end of the sleeve 135 as it appears in FIG. 4 has members 136 disposed at the inside thereof which form a chamfered restriction at the end of the sleeve 135.

The left end of the shaft 128 as it appears in FIG. 4 is bored axially to receive the shank 132 of a conventional collet member 134, which is of the type having axially disposed slits therein to enable the head of the collet member 134 to collapse inwardly.

The actuator 108 is illustrated in FIG. 4 as having been energized to move its piston rod 110 to the left as it appears in FIG. 4, thus pressing the shaft 128 to the left, with the result that the collet member 134 is in a collapsed position so as to grip to shaft of the armature 102 appearing in FIG. 4.

The armature 102 being gripped by the collet member 134 is indexed to whatever rotary position may be desired for purposes of winding by means of an actuator 150 having a piston 152 to which is mounted a plate-like member 154 visible in FIG. 3 through an access window 153. The member 154 is clamped between clamp members 156 retained to the member 154 by a suitable fastener 158. As best appears in FIG. 3, the clamp members 156 clamp upon vertically disposed racks 160 which are held in opposite sides of an extension 155 from the member 154 by suitable fasteners 162. The spaced apart relation of the racks 160 is such that each rack separately has toothed engagement with the gear 130, there being one gear 130 for each one of the pair of armatures 102 being handled by the gripping mechanism 100. Thus, there are two actuators 108, two actuator rods 128, two collet members 134 and associated components in the mechanism 100.

Quite evidently, by up and down movements of the actuator 150, the racks 160 engaged to the gears 130 which are keyed to the sleeves 135 frictionally engaged to the collet members 134, the pair of unwound or partially wound armatures 102 can be indexed oppositely to desired rotary positions.

The previously mentioned tang shields 106 can be seen to be ganged together by means of a shield plate 148 appearing in FIG. 1 and also in FIG. 3. An actuator 144 appearing in FIG. 4 moves a piston rod 146 engaged to the shield plate 148 to advance and retract the tang shields 106 as desired.

Summarizing the operation of the gripping mechanism 100, this mechanism embodies two actuators 108 which are energizable to cause two collet members 134 to grip the shafts of two armatures 102. The two armatures 102 are then rotatable in unison to any desired indexing position by operation of the actuator 150, only one such actuator being required for this purpose. Further, by operation of the actuator 144, the tang shields 106 may be positioned in unison either to cover or expose commutator tangs (not shown) for wire hooking.

The gripping mechanism 98 is of a construction substantially identical to the gripping mechanism 100, and accordingly no effort is made in the present application to separately describe the gripping mechanism 98.

The armature winding mechanism is schematically displayed in FIG. 1. Assuming two armatures 102 supported for winding by the gripping mechanism 100, the actuator 74 is energized as directed by the machine control 80 to advance the armatures 102 into armature receiving spaces formed in an armature support member or post 170 projecting upwardly from a plate 171 mounted on the support plate 10. The two armatures 102 are adjustably retained in their respective semicircular spaces 172 by means of winding guide members 176 equipped with cooperating semicircular spaces 174, there being one winding guide 176 for each of the two armatures 102. Conventional actuator members (not shown) are employed to position the winding guides 176 inwardly and outwardly with respect to the armature support member 170.

The winding guides 176 are rotatably mounted on position control shafts 180 by means of bearing assemblies 181, there being one bearing assembly 181 for each of the winding guides 176.

The positioning shafts 180 have axial movement within winding hubs 178 supporting winding fliers 182. Wires 184 supplied from suitable sources (not shown), there being one source for each of the fliers 182, are wound in conventional fashion by rotation of the fliers to cause the wires 184 to drop into oppositely disposed armature slots 186 as the wires are wound about the armatures 102 and into the spaces between the winding guides 176 and the armature support 170 which result from the interposition of the armatures 102. As the winding proceeds, the armatures 102 are periodically indexed to allow the wire being wound to fall into subsequent slots provided in the armatures 102.

It will be appreciated by those skilled in the art that during winding of the wire into the coil slots of the armatures 102, the tang shields 106 will be positioned outwardly so as to shield the aforementioned commutator tangs, but upon completion of the winding of a coil portion, the actuator 144 may be energized to pull the shields 106 inwardly, thus to expose the tangs such that a continued winding motion can cause the wires 184 to engage the tangs. Thereafter, armature indexing may occur to align the armature slots for winding of further coil portions into new armature slots.

Entry of a pilot 166 into an aperture 168 located in an upstanding plate 167 on support plate 171 assures proper alignment of the armature gripping mechanisms 98 and 100, respectively, with the semicircular spaces 172.

Although the preferred embodiments of the present invention have been described, it will be understood that various changes may be made within the scope of the appended claims.

Having thus described my invention, I claim:

1. Apparatus for transferring armature forms between a mechanism for supplying said forms and a machine for winding said forms which comprises:
 a turret plate disposed between said supply mechanism and said winding machine,
 first armature gripping means, said turret plate having first means supporting said first armature gripping means for movement along said turret plate,
 second armature gripping means, said turret plate having second means supporting said second armature gripping means for movement along said turret plate,
 means for moving said first armature gripping means along said turret plate toward one margin of said turret plate and oppositely toward the center of said turret plate,
 means for moving said second armature gripping means along said turret plate toward another margin of said turret plate and oppositely toward the center of said turret plate,
 each said armature gripping means comprising a collet mechanism and means for operating said collet mechanism,
 and means for rotating said turret plate from a first position, wherein said first armature gripping means when moved toward said one margin is located adjacent said supply mechanism and said second armature gripping means when moved toward said other margin is located adjacent said winding machine, to a second position reversing the positions of said first and second armature gripping means and for reversely rotating said turret plate to return said first and second gripping means to the first-mentioned position so that said armature gripping means can be used to grip an unwound armature form from said supply mechanism, position said unwound armature form adjacent said winding machine and return to said supply mechanism by repeated operation of said turret plate rotating means.

2. The apparatus of claim 1 wherein said supply mechanism includes means for receiving a wound armature form after being wound at said winding machine.

3. The apparatus of claim 2 wherein said supply mechanism includes a pallet having spaced bores for holding said unwound and wound armature forms.

4. The apparatus of claim 1 wherein said armature gripping means further comprise means for indexing the armatures gripped thereby, said indexing means comprising means for rotating said collet mechanisms, there being one collet mechanism rotating means for each said armature gripping means.

5. Apparatus for transferring armature forms between a mechanism for supplying and receiving said forms and a machine for winding such forms which comprises:
 a turret plate extending between said mechanism and said winding machine, said turret plate having opposite margins,
 first armature gripping means supported on said turret plate for movement toward one of said margins,
 second armature gripping means supported on said turret plate for movement toward the other of said margins,
 means for rotating said turret plate 180° from a first position wherein said one margin is disposed proximal said mechanism and said other margin is disposed proximal said winding machine to a second position wherein the positions of said margins are reversed,
 and first and second actuator means for moving said first and second gripping means, respectively, inwardly away from said margins for the rotation of said turret plate and outwardly toward said margins following rotation of said turret plate
 so that, following rotation of said turret plate to said first position, said first actuator means moves said first armature gripping means toward said one margin for gripping an armature form and said second actuator moves said second armature gripping means toward said other margin to support an armature form for winding by said winding machine, and,
 following rotation of said turret plate to said second position, said first actuator means moves said first gripping means toward said one margin to present the armature form gripped thereby for winding by said winding machine and said second actuator means moves said second gripping means toward said other margin to return to said mechanism the wound armature form supported thereby.

6. In an armature winding assembly:
 an armature winding machine,
 means to supply armature forms for winding,
 a turret plate mounted for rotation about an axis disposed between said winding machine and said supply means,
 first armature gripping means disposed on said turret plate to one side of said axis,
 second armature gripping means disposed on said turret plate to an opposite side of said axis,
 said turret plate having slide means supporting said first and second armature gripping means,
 means for advancing said first armature gripping means along said slide means toward a margin of said turret plate and means for advancing said second armature gripping means along said slide toward another margin of said turret plate,
 each said armature gripping means comprising a collet mechanism and means for operating said collet mechanism,
 and means for rotating said turret plate about said axis
  from a first position wherein said first armature gripping means when moved toward said one margin is located adjacent said supply means and said second armature gripping means when moved toward said other margin is located adjacent said winding machine
  to a second position reversing the positions of said first and second armature gripping means
  and for reversely rotating said turret plate to return said first and second armature gripping means to the first position
  so that, by repeated operations of said rotating means, said armature gripping means can each be used successively to grip an unwound armature from said supply means, support said unwound armature for winding adjacent said winding machine, and then return the wound armature to said supply means.

7. The armature winding assembly of claim 6 including upwardly projecting post means adjacent said winding machine, said post means having plural semicircular spaces therein, said winding machine having plural winding guides, one for each said semicircular space, for cooperating with said semicircular spaces to support armature forms for the winding of wire thereon by said winding machine, said semicircular spaces and said winding guides alternately supporting armature forms received from said first and second armature gripping means.

* * * * *